(12) United States Patent
Sutardja

(10) Patent No.: US 8,244,228 B1
(45) Date of Patent: Aug. 14, 2012

(54) METHOD AND APPARATUS FOR PROVIDING A MOBILE WIRELESS LOCAL AREA NETWORK

(75) Inventor: Sehat Sutardja, Los Altos Hills, CA (US)

(73) Assignee: Marvell International Ltd., Hamilton (BM)

( * ) Notice: Subject to any disclaimer, the term of this patent is extended or adjusted under 35 U.S.C. 154(b) by 47 days.

(21) Appl. No.: 10/875,362

(22) Filed: Jun. 24, 2004

(51) Int. Cl.
*H04B 1/06* (2006.01)

(52) U.S. Cl. ........ 455/416; 455/518; 455/519; 455/41.2; 370/216; 379/202.01

(58) Field of Classification Search ............ 379/202.01–206.01, 158, 157; 370/260; 455/416, 518, 455/519, 41.2
See application file for complete search history.

(56) References Cited

U.S. PATENT DOCUMENTS

| | | | | |
|---|---|---|---|---|
| 6,904,023 | B2* | 6/2005 | Albal et al. .................. | 370/260 |
| 6,957,069 | B2* | 10/2005 | Shah et al. .................. | 455/436 |
| 7,376,091 | B1* | 5/2008 | Eccles et al. ................. | 370/265 |
| 2003/0092433 | A1* | 5/2003 | Flannery ...................... | 455/416 |
| 2004/0264410 | A1* | 12/2004 | Sagi et al. .................... | 370/331 |
| 2005/0070288 | A1* | 3/2005 | Belkin et al. .................. | 455/439 |
| 2005/0070303 | A1* | 3/2005 | Lagno et al. ............... | 455/456.1 |
| 2005/0073964 | A1* | 4/2005 | Schmidt et al. .............. | 370/260 |
| 2005/0090238 | A1* | 4/2005 | Lai et al. ....................... | 455/416 |

OTHER PUBLICATIONS

ANSI/IEEE 802.11, Information technology—Telecommunications and information exchange between systems—Local and metropolitan area networks—Specific requirements, Part 11: Wireless LAN Medium Access Control (MAC) and Physical Layer (PHY) specifications, 1999 Edition, pp. 1-512.

IEEE std. 802.11a, Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications, High-speed Physical Layer in the 5 GHz Band, Adopted by the ISO/IEC and redesignated as ISO/IEC 8802-11: 1999/Amd 1:2000(E), pp. 1-83.

IEEE std. 802.11b, Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications: Higher-Speed Physical Layer Extension in the 2.4 GHz Band, Sep. 16, 1999, pp. 1-89.

IEEE P802.11g/D8.2 Draft Supplement to Standard for Information technology—Telecommunications and information exchange between systems—Local and metropolitan area networks—Specific requirements, Part 11: Wireless LAN Medium Access Control (MAC) and Physical Layer (PHY) specifications, Further Higher Data Rate Extension in the 2.4 GHz Band, Apr. 2003, pp. 1-69.

(Continued)

*Primary Examiner* — Kamran Afshar
*Assistant Examiner* — Dung Lam

(57) ABSTRACT

A first cellular phone having mobility, the first cellular phone including an access point configured to control access of a plurality of second cellular phones to a wireless local area network. The wireless local area network complies with a wireless local area network protocol. A conference controller is configured to control a flow of communication in a communication link between the plurality of second cellular phones accessing the wireless local area network. The flow of communication in the communication link between the plurality of second cellular phones is compatible with the wireless local area network protocol. The communication link between the plurality of second cellular phones is mobile in accordance with the mobility of the first cellular phone. The plurality of second cellular phones establish the communication link through the access point to form a teleconference.

7 Claims, 3 Drawing Sheets

OTHER PUBLICATIONS

IEEE Std 802.11h-2003 (Amendment to IEEE Std 802.11, 1999 Edition (Reaff 2003)); as amended by IEEE Stds 802.11a-1999, 802.11b-1999, 802.11b-1999/Cor 1-2001, 802.11d-2001, and 802.11g-2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.
802.11n; IEEE P802.11-04/0889r6; Wireless LANs, TGn Sync Proposal Technical Specification; May 2005; 135 pages.

* cited by examiner

METHOD AND APPARATUS FOR PROVIDING A MOBILE WIRELESS LOCAL AREA NETWORK

TECHNICAL FIELD

An aspect of this invention relates to wireless communication systems.

BACKGROUND

Wireless devices have become an important component of modern communication systems. Cellular phones and personal digital assistants (PDAs) are just a couple of the wireless devices that that have expanded peer-to-peer communications. Cellular phones provide mobile communication links between peers enabling people to communicate over vast distances while on the move.

Although cellular phones have expanded the mobility of peer-to-peer communications, the communication links associated with cellular phones are typically limited to being managed and controlled via the cellular system. Because of the reliance on the cellular system, cellular phone operation may be limited when operated in some environments such as inside buildings that may degrade the reception and transmission of signals between the mobile units and base stations. In addition, audible communication with the mobile units is typically limited to being controlled through the cellular system.

SUMMARY

A cellular phone comprising a wireless Local Area Network (LAN) transceiver to transmit and receive packet data based communications. A cellular transceiver to transmit and receive standard cellular system based communications. A communication interface in communication between the wireless LAN transceiver, the cellular transceiver, and an input.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
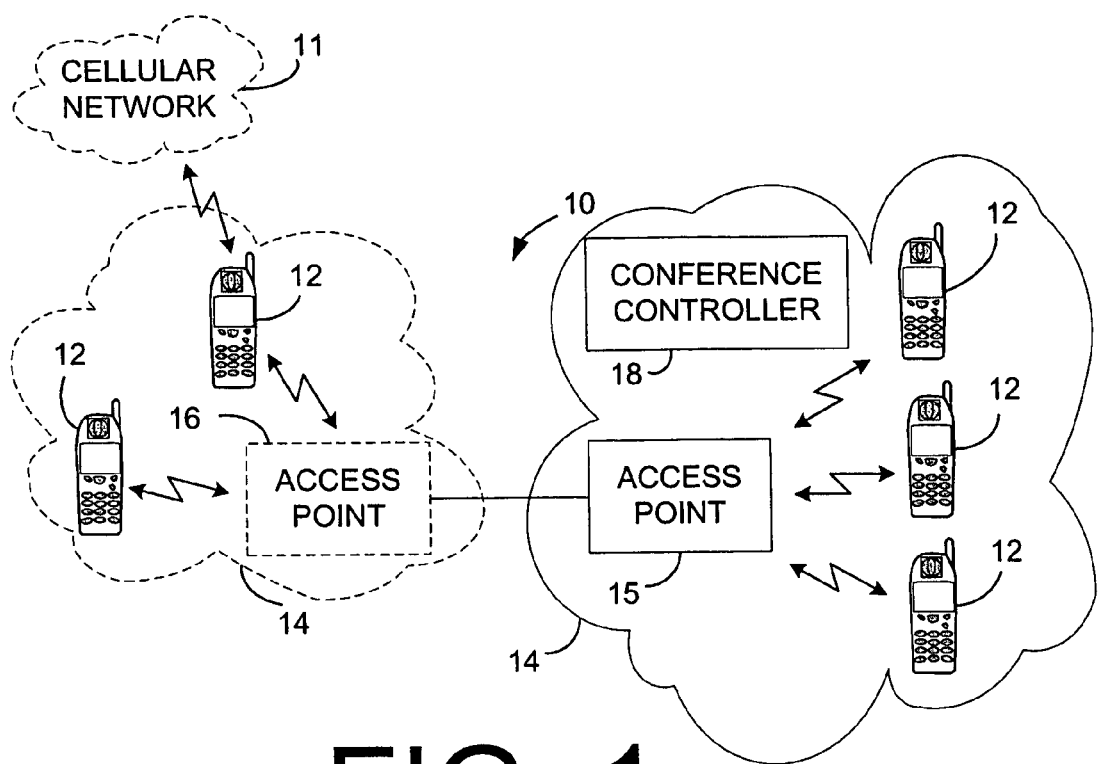
FIG. 1 is a block diagram of an aspect of a conferencing system.

FIG. 1 shows a block diagram of an aspect of a communication system 10 for teleconferencing two or more cellular phones 12 through a wireless local area network (LAN) 14. The wireless LAN 14 may be based on any type of network standard such as Ethernet and Token Ring. The cellular phones 12 may communicate, through the LAN 14 in accordance with any wireless LAN protocol such as one of the IEEE wireless LAN standards including 802.11, 802.11(a), 802.11(b), 802.11(g), 802.11(h), and 802.11(n), as well as Bluetooth, and infrared. The LAN 14 may be arranged in any type of configuration such as a star configuration, a daisy chain configuration, and combinations of star and daisy chain configurations. The cellular phones 12 may connect to the wireless LAN 14 through an access point 15. The access point 15 may be located anywhere such as being included in one or more of the cellular phones 12, integrated into a part of a LAN that includes devices other than the cellular phones 12, and an access point that is dedicated to the cellular phones 12. The cellular phones 12 may include a wireless LAN transceiver to communicate information to and from the access point 15.

The wireless LAN 14 may include a conference controller 18 to manage the communication links between the cellular phones 12. The conference controller 18 may use Voice Over Internet Protocol (VoIP) technology for controlling the flow of communication between the cellular phones 12. The conference controller 18 may be located with the access point 16, as a portion of one or more of the cellular phones 12, as a separate entity, distributed across several LAN devices such as the cellular phones 12, and be included with another network device on the LAN 14. The conference controller 18 may control packet based communication between three or more of the cellular phones 12 that are interconnected through the wireless LAN 14. One or more of the cellular phones 12 may communicate to a standard cellular network 11 based on a wireless technique such as Code Division Multiple Access (CDMA), Time Division Multiple Access (TDMA), and Global System for Mobile communication (GSM).

Figure 2:
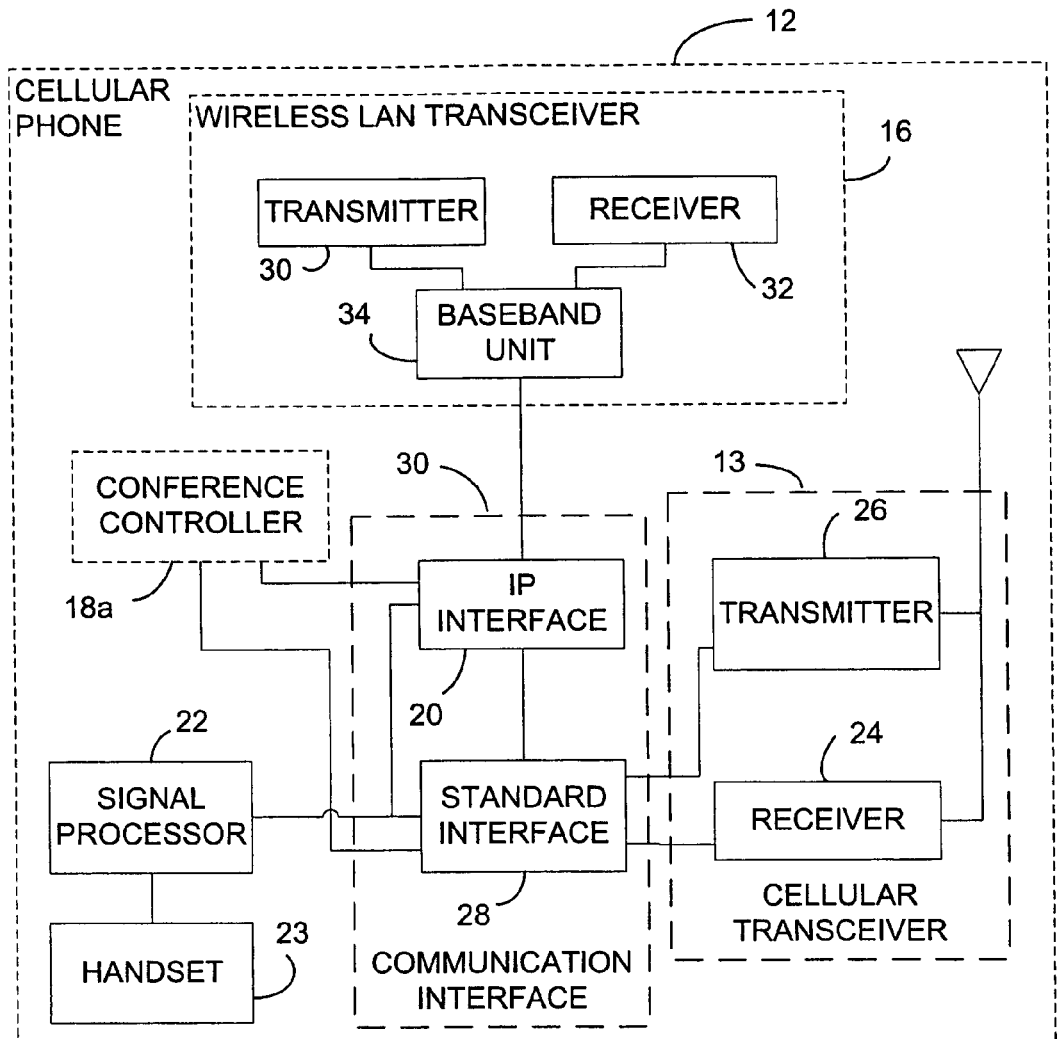
FIG. 2 is a block diagram of an aspect of a cellular phone for operation with the conferencing system.

FIG. 2 shows an aspect of a cellular phone 12 having a cellular transceiver 13 and a wireless LAN transceiver 16 to transmit and receive communications. The cellular transceiver 13 may include a receiver 24 and a transmitter 26 for communicating an information stream to and from a standard cellular phone network.

The wireless LAN transceiver 16 may include a transmitter 30 and a receiver 32 to communicate a packet based information stream to and from a LAN. A baseband unit 34 may manage formatting and physical channels and links associated with the packet based information stream.

A communication interface 30 may control the communication format of the cellular phone 12. The communication interface 30 may include an IP interface 20 and a standard interface 28. The IP interface 20 may convert an information stream of the cellular phone 12 to and from packet data that is compatible with a wireless LAN protocol such as those described above. For example, the IP interface 20 may receive an information stream from a signal processor 22 in the cellular phone 12. The IP interface 20 may convert the information stream to a flow of packet data that complies with an appropriate wireless LAN protocol. The converted and formatted packet data may be transmitted by the transmitter 30 to an access point and to one or more other cellular phones 12. In another aspect, the receiver 32 may receive packet data which the IP interface 20 may convert to digital data to be processed by the signal processor 22. A bridge connection between the IP interface 20 and the standard interface 28 may facilitate the flow of information from the IP interface 20 to the standard interface 28.

The standard interface 28 may operate in conjunction with the IP interface 20 to interface the information stream of the signal processor 22 with a standard cellular phone network that may be based on a wireless technique such as Code Division Multiple Access (CDMA), Time Division Multiple Access (TDMA), and Global System for Mobile communication (GSM). The cellular phone 12 may automatically switch between the IP interface 20 and the standard interface 28 as a function of the information stream and the digital data.

The IP interface 20 may also operate as an access point to the wireless LAN 14 to facilitate operation as any wireless LAN protocol such as those described above. A conference controller 18a may be included in the cellular phone 12 to control packet based communication between two or more cellular phones. In one aspect the conference controller 18a may be a centralized entity located in a single cellular phone 12 to control a teleconference with several other cellular phones. In another aspect the conference controller 18a may be a distributed entity having portions located in each cellular phone that is included in a teleconference.

A handset 23 in communication with the signal processor 22 may include a microphone, a speaker, and a keyboard as an interface to a user of the cellular phone 12.

Figure 3:
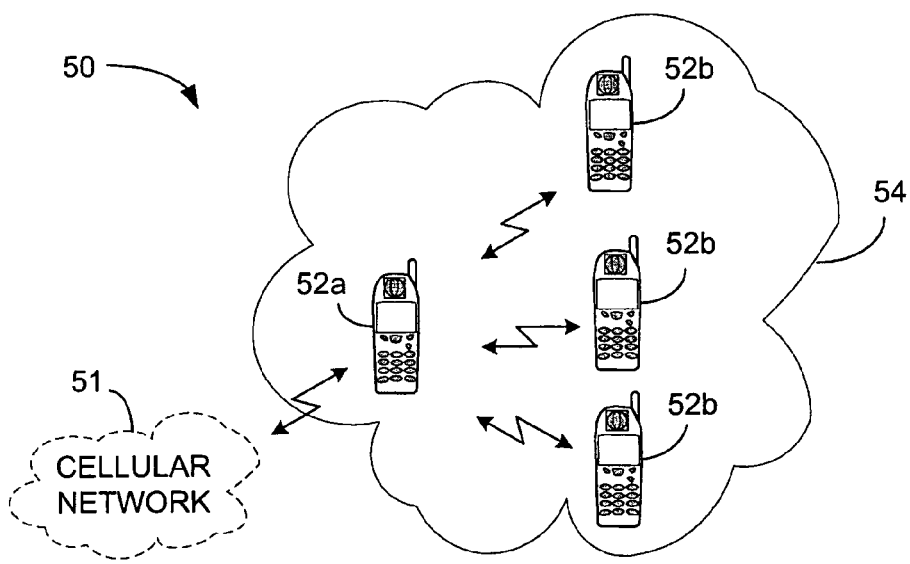
FIG. 3 is a block diagram of another aspect of a conferencing system.

FIG. 3 shows an aspect of a communication system 50 similar in function to the communication system 10. The communication system 50 includes a wireless LAN 54 having a star configuration. The wireless LAN 54 comprises several cellular phones 52a and 52b of which one cellular phone 52a includes an access point module to control access to a wireless LAN 54. One or more of the other cellular phones 52b may establish a communication link through the access point to form a teleconference. Each of the cellular phones 52a and 52b includes an IP interface for packet based communication. In combination, the cellular phones 52a and 52b may form the entire wireless LAN 54, or the wireless LAN 54 may include other network devices. The cellular phone 52a may include a conference controller 56 to manage packet based communication links during a teleconference between two or more of the cellular phones 52a and 52b. One or more of the cellular phones 52a and 52b may communicate to a standard cellular network 51 based on a wireless technique described above.

Figure 4:
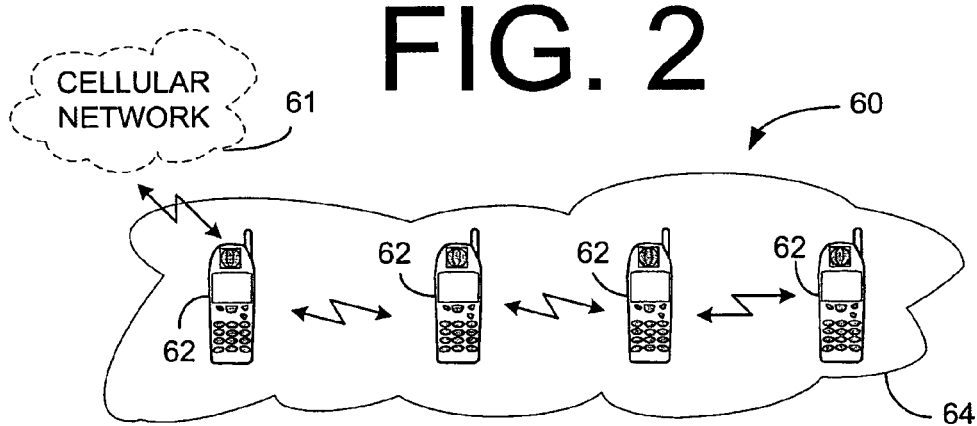
FIG. 4 is a block diagram of another aspect of a conferencing system.

FIG. 4 shows an aspect of another communication system 60 similar in function to the communication system 10. The communication system 60 includes a wireless LAN 64 having a daisy chain configuration of two or more cellular phones 62. Each of the cellular phones 62 includes an IP interface for packet based communication and an access point module to control access to a wireless LAN 64 formed by the cellular phones 64. Each of the cellular phones 62 may also include a conference controller to control packet based communication links during a teleconference between two or more of the cellular phones 62. The daisy chain configuration advantageously reduces the processing power required to conduct the teleconference by distributing the processing load across the cellular phones 62. One or more of the cellular phones 62 may communicate to a standard cellular network 61 based on a wireless technique described above.

Figure 5:
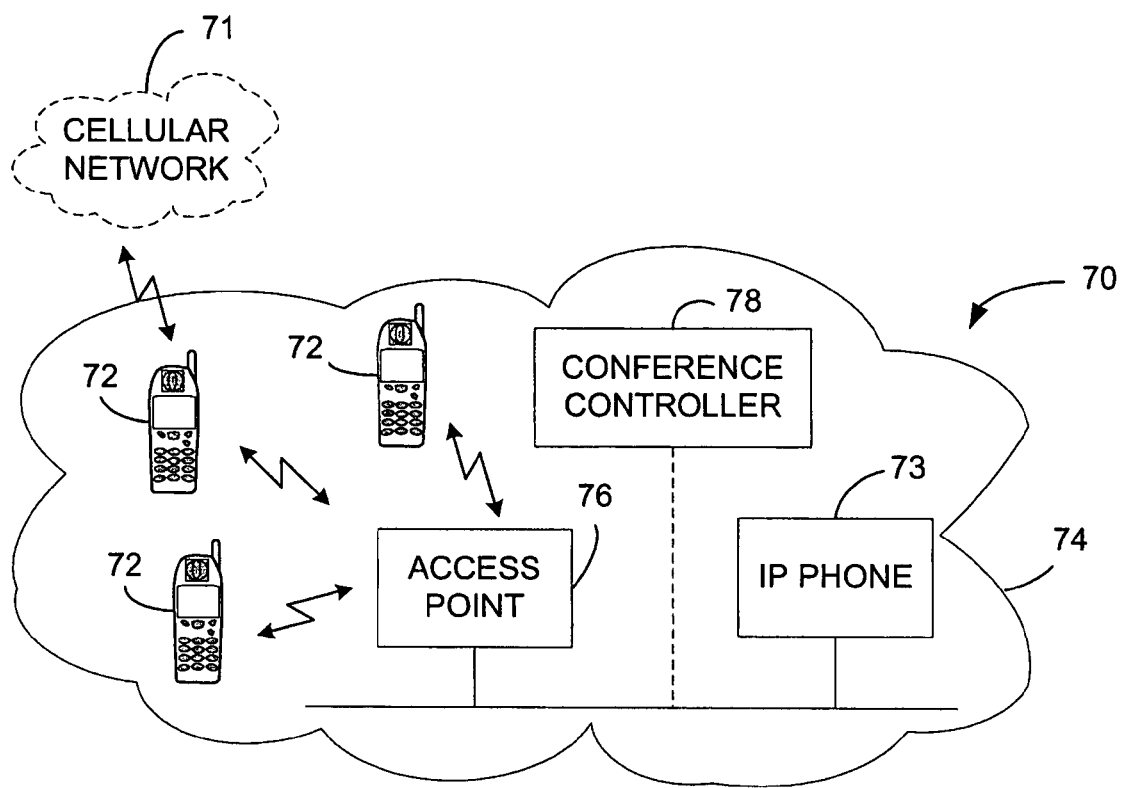
FIG. 5 is a block diagram of another aspect of a conferencing system.

FIG. 5 shows an aspect of another communication system 70 similar in function to the communication system 10. The communication system 70 includes a LAN 74 for interconnecting several cellular phones 72 and at least one Internet Protocol (IP) phone 73. The LAN 72 may comply with any wired network standard such as Ethernet and Token Ring. The LAN includes a wired connection to the IP phone 73 and wireless connections through an access point 76 to the cellular phones 72. Each of the cellular phones 72 includes an IP interface for packet based communication. A conference controller 78 may control packet based communication links between the IP phone 73 and the cellular phones 72 during a teleconference of two or more of the phones 72 and 73. The conference controller 78 may be located anywhere on the LAN 74 such as being distributed within each of the cellular phones 72, co-located with the access point 76, and located as a separate entity on the LAN 74. One or more of the cellular phones 72 may communicate to a standard cellular network 71 based on a wireless technique described above.

A number of embodiments of the invention have been described. Nevertheless, it will be understood that various modifications may be made without departing from the spirit and scope of the invention. Accordingly, other embodiments are within the scope of the following claims.

What is claimed is:

1. A first cellular phone having mobility, the first cellular phone comprising:
an access point in the first cellular phone, the access point configured to control access of a plurality of second cellular phones to a wireless local area network, wherein the wireless local area network complies with an 802.11 wireless local area network protocol, and wherein the access point is an 802.11 access point configured to provide access to the wireless local area network according to the 802.11 wireless local area network protocol;
a conference controller configured to control a flow of communication in a communication link between the plurality of second cellular phones accessing the wireless local area network via the access point,
wherein i) the flow of communication in the communication link between the plurality of second cellular phones and the first cellular phone via the access point is compatible with the wireless local area network protocol and ii) the plurality of second cellular phones establish the communication link through the access point to form a teleconference;
a wireless local area network transceiver configured to communicate packet-based information to and from the wireless local area network via the access point; and
an IP interface configured to:
convert the packet-based information from the wireless local area network into a first information stream that is compatible with a cellular phone network; and
convert a second information stream from the cellular phone network into packet data that is compatible with the wireless local area network.

2. The first cellular phone of claim 1, wherein the wireless local area network protocol is an IEEE wireless local area network standard.

3. The first cellular phone of claim 2, wherein the IEEE wireless local area network standard comprises one or more of 802.11, 802.11(a), 802.11(b), 802.11(g), 802.11(h), or 802.11(n).

4. The first cellular phone of claim 1, wherein the conference controller is configured to use Voice Over Internet Protocol (VoIP) technology for controlling the flow of communication between the plurality of second cellular phones.

5. The first cellular phone of claim 1, further comprising:
a cellular transceiver configured to communicate an information stream to and from the cellular phone network.

6. The first cellular phone of claim 1, wherein the cellular phone network is based on Code Division Multiple Access (CDMA), Time Division Multiple Access (TDMA), or Global System for Mobile (GSM) communication.

7. The first cellular phone of claim 1, wherein the conference controller is configured to control the flow of communication between the plurality of second cellular phones accessing the wireless local area network during a time that the first cellular phone is moving.

* * * * *